US012717862B2

(12) United States Patent
Yin

(10) Patent No.: US 12,717,862 B2
(45) Date of Patent: Aug. 25, 2026

(54) WEBPAGE IMAGE MONITORING METHOD AND APPARATUS, ELECTRONIC DEVICE, AND COMPUTER-READABLE STORAGE MEDIUM

(71) Applicant: BEIJING BYTEDANCE NETWORK TECHNOLOGY CO., LTD., Beijing (CN)

(72) Inventor: Guohui Yin, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 73 days.

(21) Appl. No.: 17/772,700

(22) PCT Filed: Aug. 7, 2020

(86) PCT No.: PCT/CN2020/107722
§ 371 (c)(1),
(2) Date: Apr. 28, 2022

(87) PCT Pub. No.: WO2021/082600
PCT Pub. Date: May 6, 2021

(65) Prior Publication Data

US 2023/0033164 A1 Feb. 2, 2023

(30) Foreign Application Priority Data

Oct. 28, 2019 (CN) ........................ 201911033302.8

(51) Int. Cl.
*G06F 16/957* (2019.01)
*G06F 16/953* (2019.01)
*G06F 16/958* (2019.01)

(52) U.S. Cl.
CPC ........ *G06F 16/9574* (2019.01); *G06F 16/953* (2019.01); *G06F 16/958* (2019.01)

(58) Field of Classification Search
None
See application file for complete search history.

(56) References Cited

U.S. PATENT DOCUMENTS

2014/0047413 A1* 2/2014 Sheive ...................... G06F 8/33 717/110
2014/0344663 A1* 11/2014 Joel ........................ H04L 67/02 715/234

(Continued)

FOREIGN PATENT DOCUMENTS

CN 102081624 A 6/2011
CN 103902608 A 7/2014

(Continued)

OTHER PUBLICATIONS

Second Office Action dated Jul. 4, 2022 in CN Application No. 201911033302.8 with English Translation (18 pages).

(Continued)

*Primary Examiner* — Kevin S Mai

(57) ABSTRACT

Provided are a webpage image monitoring method and apparatus, an electronic device, and a computer-readable storage medium. The method includes: generating, in response to detecting that loading of all page resources of the webpage has completed, a query request for each image in the webpage, and caching the query request in a request queue; sequentially reading, from the request queue, and transmitting at least one query request, a number of the at least one query request being smaller than or equal to a set number, and obtaining a query result for each of the at least one transmitted query request; and (S130) determining, based on the query result, whether an image corresponding to the query result is successfully loaded.

20 Claims, 2 Drawing Sheets

(56) References Cited

U.S. PATENT DOCUMENTS

| | | | | |
|---|---|---|---|---|
| 2015/0358397 | A1* | 12/2015 | Wiseman | H04L 67/02 709/201 |
| 2016/0373545 | A1 | 12/2016 | Liang et al. | |
| 2019/0108057 | A1* | 4/2019 | Wong | G06F 9/48 |

FOREIGN PATENT DOCUMENTS

| | | | |
|---|---|---|---|
| CN | 103902664 | A | 7/2014 |
| CN | 103914302 | A | 7/2014 |
| CN | 105095280 | A | 11/2015 |
| CN | 106095506 | A | 11/2016 |
| CN | 106294365 | A | 1/2017 |
| CN | 106649301 | A | 5/2017 |
| CN | 107644018 | A | 1/2018 |
| CN | 108108089 | A | 6/2018 |
| CN | 110765386 | A | 2/2020 |

OTHER PUBLICATIONS

Dreamweaver CS5, Dec. 31, 2017, English abstract only (7 pages).

First Office Action issued Dec. 2, 2021 in Chinese Patent Application No. 201911033302.8 (9 pages) with an English translation (10 pages).

How to check if pages are loaded with JavaScript, http://jingyan.baidu.com/article/63acb44a376f5961fcc17ef0.html, Mar. 25, 2022 (7 pages) with an English translation (4 pages).

International Search Report issued Nov. 10, 2020 in International Application No. PCT/CN2020/107722 (3 pages) with an English translation (5 pages).

Six ways to determine whether an image is loaded, https://www.cnblogs.com/zhusf/p/10607957.html, Nov. 28, 2021 (3 pages) with an English translation (3 pages).

Rejection Decision issued Dec. 5, 2022 in Chinese Application No. 201911033302.8, with English Translation (16 bages).

* cited by examiner

WEBPAGE IMAGE MONITORING METHOD AND APPARATUS, ELECTRONIC DEVICE, AND COMPUTER-READABLE STORAGE MEDIUM

CROSS-REFERENCE TO RELATED APPLICATIONS

This application claims priority to Chinese Patent Application No. 201911033302.8, filed on Oct. 28, 2019, which is hereby incorporated by reference in its entirety.

FIELD

The present disclosure relates to the field of image processing technologies, and more particularly, to a method and apparatus for monitoring an image in a webpage, an electronic device, and a computer-readable storage medium.

BACKGROUND

With the rapid development of Internet technology, people can access an increasingly larger amount of information, and thus information in the form of pure texts can no longer meet people's demand for information acquisition. Information in the form of images is favored by people due to its advantages such as intuitiveness and strong expressiveness. At present, webpages contain more images than ever, which also puts forward higher requirements on the image service quality of browsers. In the related art, it is hardly to effectively monitor whether images in a webpage are successfully loaded, and as a result, it is impossible to analyze the service quality of a webpage based on whether the image is successfully loaded.

SUMMARY

In a first aspect, a method for monitoring an image in a webpage is provided. The method includes: generating, in response to detecting that loading of all page resources of the webpage has completed, a query request for each image in the webpage, and caching the query request in a request queue; sequentially reading, from the request queue, and transmitting at least one query request, a number of the at least one query request being smaller than or equal to a set number, and obtaining a query result for each of the at least one transmitted query request; and determining, based on the query result, whether an image corresponding to the query result is successfully loaded.

In a second aspect, an apparatus for monitoring an image in a webpage is provided. The apparatus includes: a query request module configured to generate, in response to detecting that loading of all page resources of the webpage has completed, a query request for each image in the webpage, and cache the query request in a request queue; a query result obtaining module configured to sequentially read, from the request queue, and transmit at least one query request, a number of the at least one query request being smaller than or equal to a set number, and obtain a query result for each of the at least one transmitted query request; and a monitoring module configured to determine, based on the query result, whether an image corresponding to the query result is successfully loaded.

In a third aspect, an electronic device is provided. The electronic device includes: a memory having a computer program stored thereon; and a processor configured to call the computer program to implement the method in the first aspect of the present disclosure.

In a fourth aspect, a computer-readable storage medium is provided. The computer-readable storage medium has a computer program stored thereon. The computer program, when executed by a processor, implements the method in the first aspect of the present disclosure.

BRIEF DESCRIPTION OF DRAWINGS

The above-mentioned and other features, advantages, and aspects of the embodiments of the present disclosure will become more apparent in conjunction with the accompanying drawings and with reference to the following specific implementations. Throughout the drawings, the same or similar reference numerals indicate the same or similar elements. It should be understood that the drawings are illustrative and the components and elements are not necessarily drawn to scale.

In order to more clearly illustrate the technical solutions in the embodiments of the present disclosure, the drawings to be used in the description of the embodiments of the present disclosure will be briefly introduced below.

DESCRIPTION OF EMBODIMENTS

Figure 1:
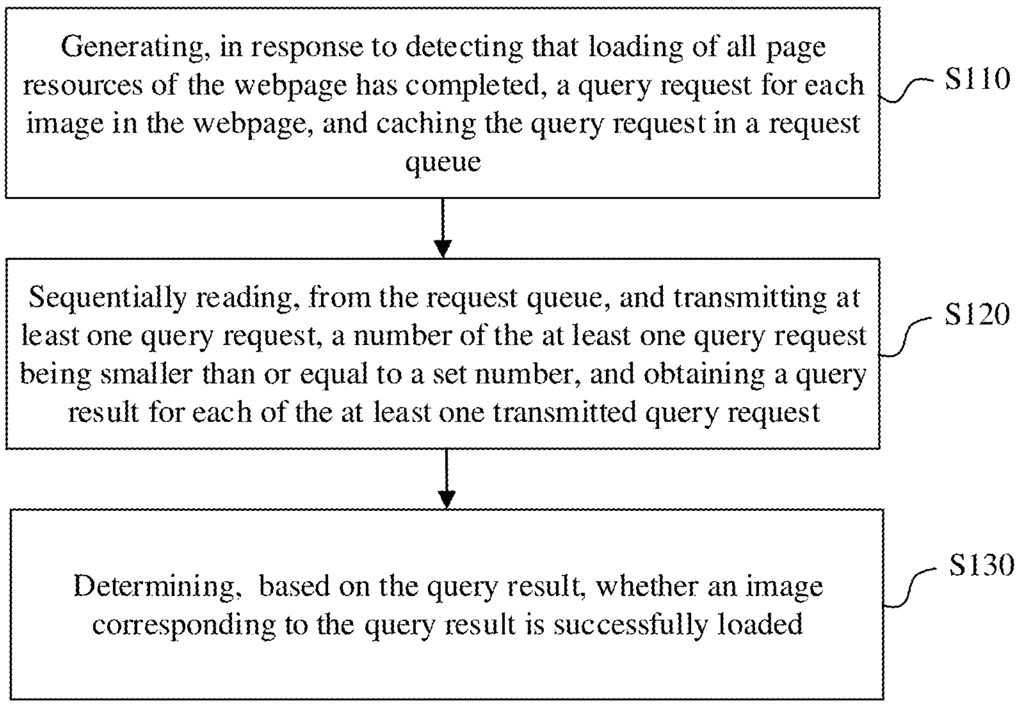
FIG. 1 is a flowchart of a method for monitoring an image in a webpage according to an embodiment of the disclosure.

Embodiments of the present disclosure will be described below in more detail with reference to the accompanying drawings. Although some embodiments of the present disclosure are illustrated in the drawings, it should be understood that the present disclosure can be implemented in various forms and should not be construed as being limited to the embodiments set forth herein. On the contrary, these embodiments are provided to facilitate a more thorough and complete understanding of the present disclosure. It should be understood that the accompanying drawings and embodiments of the present disclosure are only used for illustration purposes, rather than to limit the protection scope of the present disclosure.

It should be understood that steps described in the method embodiments of the present disclosure may be executed in different sequences, and/or in parallel. In addition, the method embodiments may include additional steps and/or omit executions of the illustrated steps. The scope of the present disclosure is not limited in this respect.

The term "include" and its variants as used herein indicate open-ended inclusions, i.e., "include, but not limited to". The term "based on" refers to "at least partially based on". The term "one embodiment" means "at least one embodiment"; the term "another embodiment" means "at least one additional embodiment"; and the term "some embodiments" means "at least some embodiments". Related definitions of other terms will be given in the following description.

It should be noted that concepts such as "first" and "second" mentioned in the present disclosure are only used to distinguish apparatuses, modules or units, and are neither used to limit these apparatuses, modules or units to be definitely different apparatuses, modules or units, nor used to limit a sequence or interdependence of the functions performed by these apparatuses, modules or units.

It should be noted that limitations such as "a" and "a plurality of" mentioned in the present disclosure are not for purpose of limitations, and can be construed as "one or more" by those skilled in the art should, unless otherwise clearly indicated in the context.

Names of messages or information exchanged between different apparatuses in the embodiments of the present disclosure are only used for illustrative purposes, and are not intended to limit the scope of these messages or information.

In the related art, a software development kit (SDK) is generally used to monitor whether an image in a webpage is successfully loaded. In practical applications, in order to maintain an original operating mechanism of operation, an operation party may put codes corresponding to an SDK used to monitor whether an image is successfully loaded in a body part of a HyperText Markup Language (HTML) file of a webpage. Since the image may be loaded quickly, it is likely to occur that the SDK for monitoring the successful loading of the image is not running yet when the image loading has been completed. In this case, it is impossible to determine whether an image that has been loaded before the SDK runs is successfully loaded, resulting in an omission of information monitoring, and it is impossible to effectively monitor whether the image in the webpage is successfully loaded.

A method and apparatus for monitoring an image in a webpage, an electronic device, and a computer-readable storage medium according to the embodiments of the present disclosure are intended to solve at least one of the above technical problems in the related art.

The technical solutions of the present disclosure and ways for the technical solutions of the present disclosure to solve the above technical problems will be described in detail below with specific embodiments. The following specific embodiments can be combined with each other, and the same or similar concepts or processes may be omitted in some embodiments. The embodiments of the present disclosure will be described below in conjunction with the accompanying drawings.

FIG. 1 is a schematic flowchart of a method for monitoring an image in a webpage according to an embodiment of the present disclosure. As illustrated in FIG. 1, the method may include the following steps.

In step S110, in response to detecting that loading of all page resources of the webpage has completed, a query request for each image in the webpage is generated and cached in a request queue.

In step S120, at least one query request is sequentially read from the request queue and transmitted, a number of the at least one query request being smaller than or equal to a set number, and a query result for each of the at least one transmitted query request is obtained.

In step S130, whether an image corresponding to the query result is successfully loaded is determined based on the query result.

In the embodiments of the present disclosure, as an example, a webpage is loaded by a browser. The page resources may include, but are not limited to, characters, image resources, video resources, etc., on the webpage.

In the embodiments of the present disclosure, a method for generating a query request can be used to query an image resource corresponding to each image in the webpage, and each query request can carry an image identifier to facilitate distinguishing of respective images in the webpage.

The kernel of the browser is multi-threaded, and under the control of the kernel, respective threads operate cooperatively. Here, a data request thread is one or more threads corresponding to the query request. In practical applications, query requests for a plurality of images in the webpage may be generated at the same time. If the query requests are transmitted simultaneously, too many data request threads may be occupied, and even all data request threads that the browser can start synchronously may be taken up completely. In this case, if the user sends another request, the browser may be unable to process the user's request in time, thereby blocking the processing of tasks of the browser and prolonging the waiting time of the user.

For example, when ten query requests are transmitted simultaneously and the browser can only activate six data request threads synchronously, the data request threads of the browser are taken up completely. In this case, if the use sends a request, the request sent by the user can only be processed until the data request threads complete the processing of the transmitted query requests, resulting in a longer waiting time for the user.

In an implementation of the present disclosure, a plurality of the generated query requests is cached in the request queue, and the number of the query request smaller than or equal to the set number is sequentially read from the request queue and transmitted. In this way, the number of the query requests transmitted each time is controllable, preventing too many data request threads in the browser from being occupied, thereby enabling the browser to process other requests from the user while transmitting the query requests., and preventing the user from waiting too long.

In the embodiments of the present disclosure, the set number may be set to be smaller than a total number of data request threads that are allowed to be synchronously started by a browser for loading the webpage, and the data request threads include threads corresponding to the query requests, thereby ensuring that the query requests transmitted each time may not take up all the data request threads. For example, the set number may be one.

In the embodiments of the present disclosure, in response to successful loading of an image resource of the webpage, the image resource of the webpage is cached in a browser cache, and the query result is determined based on a cache content in the browser cache.

When a page resource (e.g., an image resource) needs to be obtained during loading of the browser, the browser may transmit an image resource-obtaining request to obtain the image resource, and in response to a successful request of the image resource, the obtained image resource is cached in the browser cache; and in response to a failed request of the image resource, no image resource is stored in the browser cache. Therefore, it can determine whether an image is successfully loaded, by transmitting the query request and querying the image resources in the browser cache. When the image resource corresponding to the image is found in the browser cache, it can be determined that the image is successfully loaded; and when the image resource corresponding to the image is not found in the browser cache, it can be determined that the image fails to be loaded.

Based on a cache mechanism of the browser, since the querying is performed in a local cache, the query result can be obtained immediately, without requesting data from a server via the network, thereby avoiding data traffic from being wasted.

In the embodiments of the present disclosure, the query requests for images are transmitted when the loading of all images in the webpage has completed, and at this moment, all image resources have been loaded. Thus, it can be ensured that query results for all query requests can be obtained to monitor whether all the images in the webpage are successfully loaded, thereby avoiding monitoring omissions. In addition, the browser may load respective page resources. In a process of loading the page resources such as images by the browser, it may occur that some images are successfully loaded while the others are not loaded yet. The image resources corresponding to the images that have not been loaded may not be stored in the local cache. In this case, when a certain image is queried in the local cache, the query result may be inaccurate, and it is impossible to effectively determine whether the image is successfully loaded. Therefore, by transmitting the query requests for the images in the webpage after all the page resources of the webpage are loaded, the obtained query results can be ensured to be accurate, thereby accurately determining whether the images in the webpage are successfully loaded.

In the embodiments of the present disclosure, when it is repeatedly detected that some images in the webpage fail to be loaded, these images can be analyzed to determine a reason of loading failures and they are subjected to the corresponding processing, thereby ensuring the user experience.

With the method provided by the embodiments of the present disclosure, in response to detecting that the loading of all the page resources of the webpage has completed, the query requests for the images in the webpage are generated and cached in the request queue, the at least one query request is sequentially read from the request queue and transmitted, where a number of the at least one query request is smaller than or equal to the set number, the query result for each of the at least one query request is obtained, and based on the query result, it is determined whether an image corresponding to the query result is successfully loaded. Based on the solutions, information about whether images are successfully loaded can be obtained by initiating an image query request, so as to monitor whether the images are successfully loaded, thereby providing data support for an analysis and improvement of web service quality based on whether the images are successfully loaded. In addition, since the at least one query request that is smaller than or equal to the set number is sequentially read from the request queue and transmitted, it is avoided that too many data request threads are occupied, and when the user initiates a request, the user will not wait for a long time, which may occur when the data request threads are excessively occupied, thereby improving the user experience.

In an optional implementation of the embodiments of the present disclosure, said sequentially reading, from the request queue, and transmitting the at least one query request, the number of the at least one query request being smaller than or equal to the set number, and obtaining the query result for each of the at least one transmitted query request includes: repeating, when a total number of query requests in the request queue is greater than the set number, an operation of reading, from the request queue, and transmitting the at least one query request, the number of the at least one query request being smaller than or equal to the set number, and obtaining the query result for each of the at least one transmitted query request, until query results for all the query requests in the request queue are obtained.

In the embodiments of the present disclosure, when the number of the query requests in the request queue is smaller than or equal to the set number, the query requests in the request queue can be transmitted simultaneously, and the query results for all the query requests in the request queue can be obtained.

For example, when the request queue includes four query requests and the set number is five, the four query requests in the request queue can be transmitted simultaneously to obtain the query results for all the four query requests in the request queue.

When the number of the query requests in the request queue is greater than the set number, at least one query request can be read from the request queue and transmitted, where the number of the at least one query request is smaller than or equal to the set number. After obtaining the query result corresponding to the at least one transmitted query request, the operation of reading, from the request queue, and transmitting the at least one query request, the number of the at least one query request being smaller than or equal to the set number, and obtaining the query result for each of the at least one transmitted query request is repeated, until the query results for all the query requests in the request queue are obtained.

For example, when the request queue includes ten query requests and the set number is five, five query requests can be read from the request queue and transmitted. After query results for the five transmitted query requests are obtained, the other five query requests can be read from the request queue and transmitted to obtain query results for the other five query requests that have been transmitted in a 2-nd transmission.

The data request threads of the browser may be occupied for generating and obtaining query results. In a process of generating and obtaining the query result for the query request that was transmitted in a previous transmission, if a new thread is started for transmitting the query request again, too many or even all data request threads of the browser may be occupied. Therefore, in the embodiments of the present disclosure, the query request is transmitted subsequent to receiving the query result for the query request that was transmitted in the previous transmission, it can be avoided that too many threads are occupied, preventing the browser from being blocked due to a full occupation of the threads of the browser.

In an optional implementation of the embodiments of the present disclosure, the query request is an Extensible Markup Language HyperText Transfer Protocol Request (XML HTTP Request).

In practical applications of the embodiments of the present disclosure, the query request may further carry a request parameter of attribute information of an image corresponding to the query request, and the attribute information may include an image type and/or an image size.

In the embodiments of the present disclosure, if the query request is the XML HTTP Request, when an image is successfully loaded, the method may further include extracting, based on the query result, the attribute information of the image.

Specifically, when the query request is the XML HTTP Request, the query result is response information of a query instruction. A response header of the response information contains the attribute information of the image. In practical applications, image attribute information of the image can be extracted from the response header in the response information through a regular expression.

In the embodiments of the present disclosure, by monitoring the image attribute information, the service quality of the webpage can be better analyzed based on the monitored image attribute information, thereby providing better data support for improving the service quality of the webpage.

In an optional implementation of the embodiments of the present disclosure, the query request further carries file position indication information of the image corresponding to the query request, and the file position indication information is used to indicate a storage position of the image in the browser cache. In the embodiments of the present disclosure, the request parameter can further be added to the query request to specify the storage position of the image in the browser cache. In practical applications, when an image introduced from a file of cascading style sheets (CSS) is queried, a query can be performed among the specified style sheets stored in the browser cache. When an image directly introduced from an image label is queried, a query can be performed in a specified and corresponding storage position in the browser cache.

In an optional implementation of the embodiments of the present disclosure, the above-mentioned method further includes: determining, in response to detecting a specific event corresponding to a HyperText Markup Language (HTML) file of the webpage, that the loading of all the page resources of the webpage has completed.

In the embodiments of the present disclosure, after the loading of all the page resources of the webpage has completed, the specific event corresponding to the HTML file of the webpage may be executed. Specifically, the specific event may be an onload event, and thus, in response to detecting the onload event corresponding to the HTML file, it can be determined whether the loading of all the page resources of the webpage has completed.

In the embodiments of the present disclosure, after it is determined that each image in the webpage has successfully loaded, information about whether the respective images are successfully loaded can be transmitted to the server, and thus the server can monitor whether the respective images are successfully loaded in time. In practical applications, only information about that images fail to be loaded can be chosen and transmitted to the server.

Figure 2:
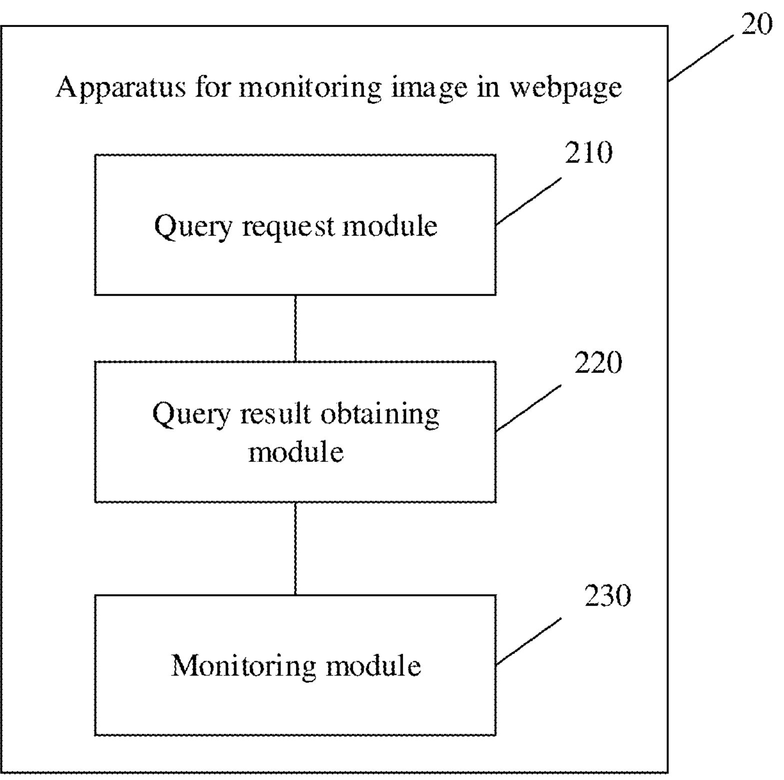
FIG. 2 is a schematic structural diagram of an apparatus for monitoring an image in a webpage according to an embodiment of the disclosure.

Based on the same principle as the method illustrated in FIG. 1, FIG. 2 illustrates a schematic structural diagram of an apparatus for monitoring an image in a webpage according to an embodiment of the present disclosure. As illustrated in FIG. 2, an apparatus 20 for monitoring an image in a webpage may include a query request module 210, a query result obtaining module 220, and a monitoring module 230.

The query request module 210 is configured to generate, in response to detecting that loading of all page resources of the webpage has completed, a query request for each image in the webpage, and cache the query request in a request queue.

The query result obtaining module 220 is configured to sequentially read, from the request queue, and transmit at least one query request, the number of the at least one query request being smaller than or equal to a set number, and obtain a query result for each of the at least one transmitted query request.

The monitoring module 230 is configured to determine, based on the query result, whether an image corresponding to the query result is successfully loaded.

With the apparatus provided by the embodiments of the present disclosure, in response to detecting that the loading of all the page resources of the webpage has completed, the query requests for the images in the webpage are generated and cached in the request queue, the at least one query request is sequentially read from the request queue and transmitted, where the number of the at least one query request is smaller than or equal to the set number, the query result for each of the at least one query request is obtained, and based on the query result, it is determined whether an image corresponding to the query result is successfully loaded. Based on the solutions, information about whether images are successfully loaded can be obtained by initiating an image query request, so as to monitor whether the images are successfully loaded, thereby providing data support for an analysis and improvement of web service quality based on whether the images are successfully loaded. In addition, since the at least one query request that is smaller than or equal to the set number is sequentially read from the request queue and transmitted, it is avoided that too many data request threads are occupied, and when the user initiates a request, the user will not wait for a long time, which may occur when the data request threads are excessively occupied, thereby improving the user experience.

Optionally, the set number is smaller than a total number of data request threads that are allowed to be synchronously started by a browser for loading the webpage, and the data request threads include one or more threads corresponding to the query request.

Optionally, the query result obtaining module is specifically configured to repeat, when a total number of query requests in the request queue is greater than the set number, an operation of reading, from the request queue, and transmit the at least one query request, the number of the at least one query request being smaller than or equal to the set number, and obtain the query result for each of the at least one transmitted query request, until query results for all the query requests in the request queue are obtained.

Optionally, the query request is an XML HTTP Request.

Optionally, the query request further carries a request parameter of attribute information of an image corresponding to the query request; and in response to determining, based on the query result, that the image corresponding to the query result is successfully loaded, the apparatus further includes an attribute information extraction module configure to extract, based on the query result, the attribute information of the image corresponding to the query result.

Optionally, in response to successful loading of an image resource of the webpage, the image resource of the webpage is cached in a browser cache, and the query result is determined based on a cache content in the browser cache.

Optionally, the query request further carries file position indication information of the image corresponding to the query request, and the file position indication information is used to indicate a storage position of the image in the browser cache.

Optionally, the apparatus further includes a page loading condition determining module configured to determine, in response to detecting a specific event corresponding to an HTML file of the webpage, that the loading of all the page resources of the webpage has completed.

Figure 3:
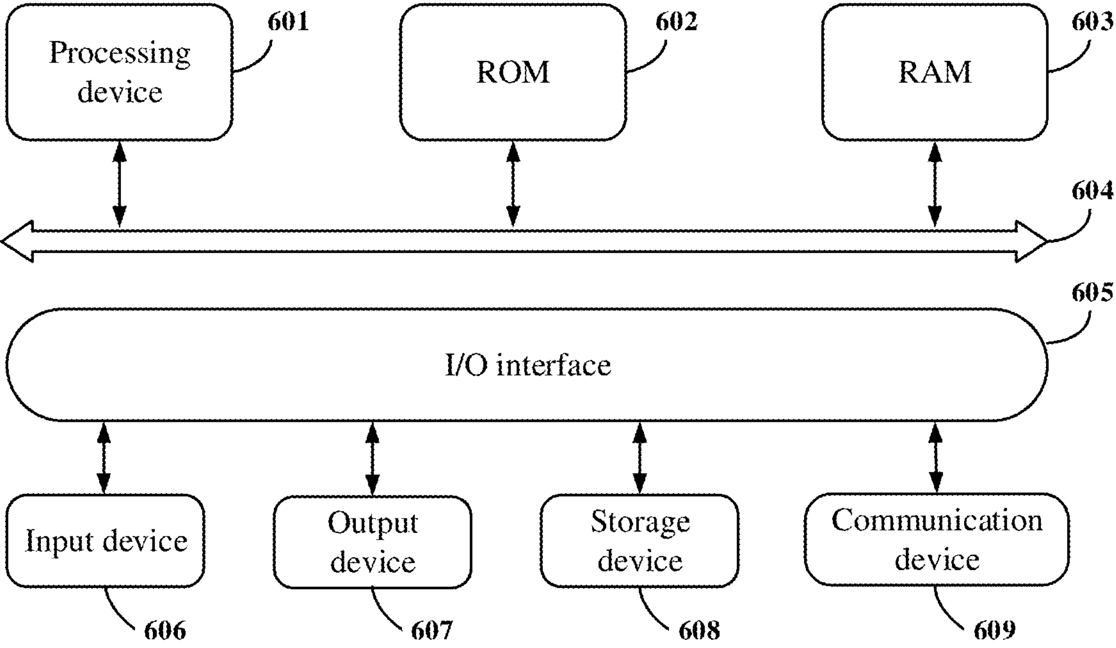
FIG. 3 is a schematic structural diagram of an electronic device according to an embodiment of the disclosure.

FIG. 3 is a schematic structural diagram of an electronic device 600 adapted to implement the embodiments of the present disclosure, for example, a terminal device configured to implement the method illustrated in FIG. 1. The terminal device according to the embodiments of the present disclosure may include, but is not limited to, a mobile terminal such as a mobile phone, a laptop computer, a digital broadcast receiver, a personal digital assistant (PDA), a tablet computer or PAD, a portable multimedia player (PMP), or a vehicle-mounted terminal (e.g., a vehicle-mounted navigation terminal), or a fixed terminal such as a digital TV, a desktop computer, etc. The electronic device illustrated in FIG. 3 is for illustration only, and should not be construed as limiting the function and scope of use of the embodiments of the present disclosure.

The electronic device includes a memory and a processor. In the present disclosure, the processor may be referred to as a processing device 601 as described below, and the memory may include at least one of a read only memory (ROM) 602, a random access memory (RAM) 603, and a storage device 608 as described below. The following provide specific details.

As illustrated in FIG. 3, the electronic device 600 may include a processing device (for example, a central processing unit, a graphics processing unit, etc.) 601, and the processing device may perform various appropriate actions and processes in accordance with programs, which are stored in an ROM 602 or loaded into an RAM 603 from a storage device 608. In the RAM 603, various programs and data required for the operation of the electronic device 600 may also be stored. The processing device 601, the ROM 602, and the RAM 603 are connected to each other through a bus 604. An input/output (I/O) interface 605 is also connected to the bus 604.

Generally, an input device 606, an output device 607, the storage device 608, and a communication device 609 may be connected to the I/O interface 605. The input device 606 includes, for example, a touch screen, a touch pad, a keyboard, a mouse, a camera, a microphone, an accelerometer, a gyroscope, etc. The output device 607 includes, for example, a liquid crystal display (LCD), a speaker, an oscillator, etc. The storage device 608 includes, for example, a magnetic tape or a hard disk. The communication device 609 allows the electronic device 600 to perform wireless or wired communication with other devices for data exchange. Although FIG. 3 illustrates the electronic device 600 having various devices, it can be appreciated that it is not necessary to implement or provide all the illustrated devices. Alternatively, more or fewer devices may be implemented or provided.

In particular, according to the embodiments of the present disclosure, the processes described above with reference to the flowcharts may be implemented as computer software programs. For example, the embodiments of the present disclosure include a computer program product, which includes a computer program carried on a non-transitory computer-readable medium. The computer program includes program codes for implementing the method illustrated in the flowcharts. In these embodiments, the computer program may be downloaded and installed from a network through the communication device 609, or installed from the storage device 608, or installed from the ROM 602. When the computer program is executed by the processing device 601, the above-mentioned functions defined in the method according to the embodiments of the present disclosure are performed.

It should be noted that the above computer-readable medium in the present disclosure may be a computer-readable signal medium, a computer-readable storage medium, or any combination thereof. The computer-readable storage medium may be, but are not limited to, an electrical, magnetic, optical, electromagnetic, infrared, or semiconductor system, an electrical, magnetic, optical, electromagnetic, infrared, or semiconductor apparatus, or an electrical, magnetic, optical, electromagnetic, infrared, or semiconductor device, or any combinations thereof. More specific examples of the computer-readable storage medium may include, but are not limited to, an electrical connection having one or more wires, a portable computer disk, a hard disk, an RAM, an ROM, an erasable programmable read only memory (EPROM) or a flash memory, an optical fiber, a compact disc read-only memory (CD-ROM), an optical memory device, a magnetic memory device, or any suitable combination thereof. In the present disclosure, the computer-readable storage medium may be any tangible medium including or storing programs, which may be used by or in combination with an instruction execution system, apparatus, or device. In the present disclosure, the computer-readable signal medium may include a data signal propagated in a baseband or as a part of a carrier that carries computer-readable program codes. The propagated data signal may be in various forms, including, but not limited to, an electromagnetic signal, an optical signal, or any suitable combination thereof. The computer-readable signal medium may also be any computer-readable medium other than the computer-readable storage medium, which can transmit, propagate, or transfer programs used by or used with an instruction execution system, apparatus or device. The program codes contained on the computer-readable medium may be transmitted via any appropriate medium, including, but not limited to, an electric cable, an optical cable, radio frequency (RF), or any suitable combinations thereof.

In some embodiments, the client and server may communicate with each other by using any currently-known or future-developed network protocol, such as HyperText Transfer Protocol (HTTP), and the client and server may be in interconnection communication with digital data in any form or medium (e.g., a communication network). Examples of communication networks include a local area network ("LAN"), a wide area network ("WAN"), the Internet work (e.g., the Internet), and an end-to-end network (e.g., ad hoc end-to-end networks), as well as any currently-known or future-developed network.

The above computer-readable medium may be included in the above electronic device; or may be standalone without being assembled into the electronic device.

The above computer-readable medium may carry one or more programs. The one or more programs, when executed by the electronic device, cause the electronic device to: generate, in response to detecting that loading of all page resources of the webpage has completed, a query request for each image in the webpage, and cache the query request in a request queue; sequentially read, from the request queue, and transmit at least one query request, a number of the at least one query request being smaller than or equal to a set number, and obtain a query result for each of the at least one transmitted query request; and determine, based on the query result, whether an image corresponding to the query result is successfully loaded.

The computer program code for implementing the operations of the present disclosure can be written in one or more programming languages or any combination thereof. The programming languages include, but are not limited to, object-oriented programming languages, such as Java, Smalltalk, or C++, as well as conventional procedure-oriented programming languages, such as "C" language or similar programming languages. The program codes can be executed completely on a user's computer, partly on the user computer, as a standalone software package, partly on the user computer and partly on a remote computer, or completely on the remote computer or server. In a case where the remote computer is involved, the remote computer can be connected to the user computer through any types of network, including a local area network (LAN) or a wide area network (WAN), or to an external computer (e.g., over the Internet by using an Internet service provider).

The flowcharts and block diagrams in the drawings illustrate architecture, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It also should be noted that, in some alternative implementations, functions illustrated in blocks may also occur in a different order from the order shown in the figures. For example, two successive blocks as illustrated can actually be executed substantially in parallel with each other, and sometimes even in a reverse order, depending on functions involved. It should also be noted that each block in the block diagrams and/or flowcharts, or any combination of the blocks in the block diagrams and/or flowcharts, can be implemented using a dedicated hardware-based system that is configured to perform the specified functions or operations or using a combination of dedicated hardware and computer instructions.

Modules or units involved in the embodiments described in the present disclosure can be implemented in software or hardware. Here, a name of a module or unit does not constitute a limitation on the module or unit itself under certain circumstances. For example, a monitoring module can also be described as "a module configured to determine whether images corresponding to respective query results are successfully loaded."

The functions described herein above may be performed, at least in part, by one or more hardware logic components. For example, without limitation, exemplary types of suitable hardware logic components include a field programmable gate array (FPGA), an application specific integrated circuit (ASIC), an application specific standard product (ASSP), a system on chip (SOC), a complex programmable logic device (CPLD), and the like.

In the context of the present disclosure, a machine-readable medium may be a tangible medium, which may include or store a program, which is to be used by or in connection with an instruction execution system, apparatus, or device. The machine-readable medium may be a machine-readable signal medium or a machine-readable storage medium. The machine-readable medium may include, but not limited to, an electrical, magnetic, optical, electromagnetic, infrared, or semiconductor system, an electrical, magnetic, optical, electromagnetic, infrared, or semiconductor apparatus, an electrical, magnetic, optical, electromagnetic, infrared, or semiconductor device, or any suitable combinations thereof. More specific examples of the machine-readable storage media may include an electrical connection having one or more wires, a portable computer disk, a hard disk, an RAM, an ROM, an EPROM or a flash memory, an optical fiber, a CD-ROM, an optical memory device, a magnetic memory device, or any suitable combination thereof.

According to one or more embodiments of the present disclosure, the present disclosure provides a method for monitoring an image in a webpage. The method includes: generating, in response to detecting that loading of all page resources of the webpage has completed, a query request for each image in the webpage, and caching the query request in a request queue; sequentially reading, from the request queue, and transmitting at least one query request, a number of the at least one query request being smaller than or equal to a set number, and obtaining a query result for each of the at least one transmitted query request; and determining, based on the query result, whether an image corresponding to the query result is successfully loaded.

With the method for monitoring the image in the webpage provided by the present disclosure, the set number is smaller than a total number of data request threads that are allowed to be synchronously started by a browser for loading the webpage, and the data request threads include one or more threads corresponding to the at least one query request.

In the method for monitoring the image in the webpage provided by the present disclosure, sequentially reading, from the request queue, and transmitting the at least one query request, the number of the at least one query request being smaller than or equal to the set number, and obtaining the query result for each of the at least one transmitted query request includes: repeating, when a total number of query requests in the request queue is greater than the set number, an operation of reading, from the request queue, and transmitting the at least one query request, the number of the at least one query request being smaller than or equal to the set number, and obtaining the query result for each of the at least one transmitted query request, until query results for all the query requests in the request queue are obtained; reading, when the total number of query requests in the request queue is smaller than or equal to the set number, from the request queue, and transmitting the at least one query request, the number of the at least one query request being smaller than or equal to the set number, and obtaining query results for all the query requests in the request queue.

In the method for monitoring the image in the webpage provided by the present disclosure, the query request is an XML HTTP Request.

In the method for monitoring the image in the webpage provided by the present disclosure, the query request further carries a request parameter of attribute information of an image corresponding to the query request; and in response to determining, based on the query result, that the image corresponding to the query result is successfully loaded, the method further includes: extracting, based on the query result, the attribute information of the image corresponding to the query result.

In the method for monitoring the image in the webpage provided by the present disclosure, in response to successful loading of an image resource of the webpage, the image resource of the webpage is cached in a browser cache, and the query result is determined based on a cache content in the browser cache.

In the method for monitoring the image in the webpage provided by the present disclosure, the query request further carries file position indication information of the image corresponding to the query request, and the file position indication information is used to indicate a storage position of the image in the browser cache.

The method for monitoring the image in the webpage provided by the present disclosure further includes: determining, in response to detecting an onload event corresponding to an HTML file of the webpage, that the loading of all the page resources of the webpage has completed.

The method for monitoring the image in the webpage provided by the present disclosure further includes: transmitting, to the server, information about whether the respective images corresponding to query results are successfully loaded.

According to one or more embodiments of the present disclosure, the present disclosure provides an apparatus for monitoring an image in a webpage. The apparatus includes: a query request module configured to generate, in response to detecting that loading of all page resources of the webpage has completed, a query request for each image in the webpage, and cache the query request in a request queue; a query result obtaining module configured to sequentially read, from the request queue, and transmit at least one query request, the number of the at least one query request being smaller than or equal to a set number, and obtain a query result for each of the at least one transmitted query request; and a monitoring module configured to determine, based on the query result, whether an image corresponding to the query result is successfully loaded.

For the apparatus for monitoring the image in the webpage provided by the present disclosure, the set number is smaller than a total number of data request threads that are allowed to be synchronously started by a browser for loading the webpage, and the data request threads include one or more threads corresponding to the at least one query request.

In the apparatus for monitoring the image in the webpage provided by the present disclosure, the query result obtaining module is specifically configured to: repeat, when a total number of query requests in the request queue is greater than the set number, an operation of reading, from the request queue, and transmit the at least one query request, the number of the at least one query request being smaller than or equal to the set number, and obtain the query result for each of the at least one transmitted query request, until query results for all the query requests in the request queue are obtained.

In the apparatus for monitoring the image in the webpage provided by the present disclosure, the query request is an XML HTTP Request.

In the apparatus for monitoring the image in the webpage provided by the present disclosure, the query request further carries a request parameter of attribute information of an image corresponding to the query request; and in response to determining, based on the query result, that the image corresponding to the query result is successfully loaded, the method further includes: extracting, based on the query result, the attribute information of the image corresponding to the query result.

In the apparatus for monitoring the image in the webpage provided by the present disclosure, in response to successful loading of an image resource of the webpage, the image resource of the webpage is cached in a browser cache, and the query result is determined based on a cache content in the browser cache.

In the apparatus for monitoring the image in the webpage provided by the present disclosure, the query request further carries file position indication information of the image corresponding to the query request, and the file position indication information is used to indicate a storage position of the image in the browser cache.

In the apparatus for monitoring the image in the webpage provided by the present disclosure further includes a page loading condition determining module configured to determine, in response to detecting a specific event corresponding to an HTML file of the webpage, that the loading of all the page resources of the webpage has completed.

The above description is only intended to explain the preferred embodiments of the present disclosure and the employed principles of the technology. It will be appreciated by those skilled in the art that the scope of the present disclosure herein is not limited to the technical solutions formed by the specific combination of the above technical features, but also encompasses any other combinations of features described above or equivalents thereof, without departing from the above concept of the present disclosure. For example, the above features and the technical features disclosed in the present disclosure having similar functions (but not limited to them) are replaced with each other to form the technical solution.

Further, although the operations are depicted in a specific order, this should not be understood as requiring these operations to be performed in the specific order illustrated or in a sequential order. Under certain circumstances, multitasking and parallel processing may be advantageous. Likewise, although several specific implementation details are included in the above discussion, these should not be construed as limitations on the scope of the disclosure. Certain features that are described in the context of separate embodiments can also be implemented in combination in a single embodiment. Conversely, various features described in the context of a single embodiment can also be implemented in multiple embodiments separately or in any suitable subcombination.

Although the subject matter has been described in language specific to structural features and/or logical actions of the method, it should be understood that the subject matters defined in the appended claims are not necessarily limited to the specific features or actions described above. On the contrary, the specific features and actions described above are merely exemplary forms of implementing the claims.

What is claimed is:

1. A method for monitoring an image in a webpage, comprising:

generating, in response to detecting that loading of all page resources of the webpage has completed, image loading success query requests each for querying a local browser cache to determine whether a respective one of images in the webpage is successfully loaded, and caching the image loading success query requests in an image loading success query request queue, wherein the image loading success query requests each carries file position indication information of the image corresponding to the image loading success query request, and the file position indication information is used to indicate a storage position of the image in the local browser cache;

sequentially reading, from the image loading success query request queue, and transmitting a first number of the image loading success query requests to the first number of data request threads of a browser for simultaneous processing, the first number being smaller than or equal to a set number, and the set number being smaller than a total number of data request threads that are allowed to be synchronously started by the browser loading the webpage;

obtaining, based on a cache content in the local browser cache, an image loading success query result for each of the transmitted first number of image loading success query requests, wherein said obtaining, based on the cache content in the local browser cache, the image loading success query result for each of the transmitted first number of image loading success query requests comprises: querying, in the local browser cache, the image corresponding to the image loading success query request, to determine whether the image is found in the local browser cache as the image loading success query result; and determining, based on the image loading success query result, whether an image corresponding to the image loading success query result is successfully loaded, wherein said determining, based on the image loading success query result, whether the image corresponding to the image loading success query result is successfully loaded comprises: determining that the image is successfully loaded, when it is determined that the image is found in the local browser cache; and determining that the image is unsuccessfully loaded, when it is determined that the image is not found in the local browser cache.

2. The method according to claim 1, wherein the set number is smaller than a total number of data request threads that are allowed to be synchronously started by a browser for loading the webpage, and the data request threads comprise one or more threads corresponding to the at least one image loading success query request.

3. The method according to claim 1, wherein when a total number of image loading success query requests in the image loading success query request queue is greater than the set number, an operation of reading, from the image loading success query request queue, and transmitting the first number of the image loading success query requests to the first number of data request threads of the browser for simultaneous processing, and an operation of obtaining, based on the cache content in the local browser cache, the image loading success query result for each of the transmitted first number of image loading success query requests are repeated, until image loading success query results for all the image loading success query requests in the image loading success query request queue are obtained.

4. The method according to claim 1, wherein the image loading success query request is an Extensible Markup Language HyperText Transfer Protocol Request (XML HTTP Request).

5. The method according to claim 4, wherein the image loading success query request further carries a request parameter of attribute information of an image corresponding to the image loading success query request; and in response to determining, based on the image loading success query result, that the image corresponding to the image loading success query result is successfully loaded, the method further comprises:

extracting, based on the image loading success query result, the attribute information of the image corresponding to the image loading success query result.

6. The method according to claim 4, wherein in response to successful loading of an image resource of the webpage, the image resource of the webpage is cached in the local browser cache.

7. The method according to claim 1, further comprising:

determining, in response to detecting a specific event corresponding to a HyperText Markup Language (HTML) file of the webpage, that the loading of all the page resources of the webpage has completed.

8. The method according to claim 1, further comprising:

while the first number of data request threads of the browser are used to simultaneously process the first number of the image loading success query requests, processing data requests from a user other than the first number of the image loading success query requests by using a second number of data request threads of the browser which are synchronously started with the first number of data request threads, a sum of the first number and the second number of data request threads being smaller than or equal to the total number of data request threads that are allowed to be synchronously started by the browser.

9. An electronic device, comprising:

a memory having a computer program stored thereon; and a processor configured to call the computer program to implement a method for monitoring an image in a webpage, wherein the method comprises:

generating, in response to detecting that loading of all page resources of the webpage has completed, image loading success query requests each for querying a local browser cache to determine whether a respective one of images in the webpage is successfully loaded, and caching the image loading success query requests in an image loading success query request queue, wherein the image loading success query requests each carries file position indication information of the image corresponding to the image loading success query request, and the file position indication information is used to indicate a storage position of the image in the local browser cache;

sequentially reading, from the image loading success query request queue, and transmitting a first number of the image loading success query requests to the first number of data request threads of a browser for simultaneous processing, the first number being smaller than or equal to a set number, and the set number being smaller than a total number of data request threads that are allowed to be synchronously started by the browser loading the webpage;

obtaining, based on a cache content in the local browser cache, an image loading success query result for each of the transmitted first number of image loading success query requests, wherein said obtaining, based on the cache content in the local browser cache, the image loading success query result for each of the transmitted first number of image loading success query requests comprises: querying, in the local browser cache, the image corresponding to the image loading success query request, to determine whether the image is found in the local browser cache as the image loading success query result; and determining, based on the image loading success query result, whether an image corresponding to the image loading success query result is successfully loaded, wherein said determining, based on the image loading success query result, whether the image corresponding to the image loading success query result is successfully loaded comprises: determining that the image is successfully loaded, when it is determined that the image is found in the local browser cache; and determining that the image is unsuccessfully loaded, when it is determined that the image is not found in the local browser cache.

10. The electronic device according to claim 9, wherein the set number is smaller than a total number of data request threads that are allowed to be synchronously started by a browser for loading the webpage, and the data request threads comprise one or more threads corresponding to the at least one image loading success query request.

11. The electronic device according to claim 9, wherein:

when a total number of image loading success query requests in the image loading success query request queue is greater than the set number, an operation of reading, from the image loading success query request queue, and transmitting the first number of the image loading success query requests to the first number of data request threads of the browser for simultaneous processing, and an operation of obtaining the image loading success query result for each of the transmitted first number of image loading success query requests are repeated, until image loading success query results for all the image loading success query requests in the image loading success query request queue are obtained.

12. The electronic device according to claim 9, wherein the image loading success query request is an Extensible Markup Language HyperText Transfer Protocol Request (XML HTTP Request).

13. The electronic device according to claim 12, wherein the image loading success query request further carries a request parameter of attribute information of an image corresponding to the image loading success query request; and in response to determining, based on the image loading success query result, that the image corresponding to the image loading success query result is successfully loaded, the method further comprises:

extracting, based on the image loading success query result, the attribute information of the image corresponding to the image loading success query result.

14. The electronic device according to claim 12, wherein in response to successful loading of an image resource of the webpage, the image resource of the webpage is cached in the local browser cache.

15. The electronic device according to claim 9, further comprising:

determining, in response to detecting a specific event corresponding to a HyperText Markup Language (HTML) file of the webpage, that the loading of all the page resources of the webpage has completed.

16. The electronic device according to claim 9, wherein the method further comprises:

while the first number of data request threads of the browser are used to simultaneously process the first number of the image loading success query requests, processing data requests from a user other than the first number of the image loading success query requests by using a second number of data request threads of the browser which are synchronously started with the first number of data request threads, a sum of the first number and the second number of data request threads being smaller than or equal to the total number of data request threads that are allowed to be synchronously started by the browser.

17. A computer-readable storage medium, having a computer program stored thereon, wherein the computer program, when executed by a processor, implements the method according to claim 1.

18. The computer-readable storage medium according to claim 17, wherein the computer program, when executed by a processor, implements actions of:

repeating, when a total number of image loading success query requests in the image loading success query request queue is greater than the set number, an operation of reading, from the image loading success query request queue, and transmitting the first number of the image loading success query requests to the first number of data request threads of the browser for simultaneous processing, and an operation of obtaining the image loading success query result for each of the transmitted first number of image loading success query requests, until image loading success query results for all the image loading success query requests in the image loading success query request queue are obtained.

19. The computer-readable storage medium according to claim 17, wherein the computer program, when executed by a processor, implements actions of:

determining, in response to detecting a specific event corresponding to a HyperText Markup Language (HTML) file of the webpage, that the loading of all the page resources of the webpage has completed.

20. The computer-readable storage medium according to claim 17, wherein the method further comprises:

while the first number of data request threads of the browser are used to simultaneously process the first number of the image loading success query requests, processing data requests from a user other than the first number of the image loading success query requests by using a second number of data request threads of the browser which are synchronously started with the first number of data request threads, a sum of the first number and the second number of data request threads being smaller than or equal to the total number of data request threads that are allowed to be synchronously started by the browser.

* * * * *